United States Patent [19]

Turner

[11] 4,028,288

[45] June 7, 1977

[54] MOLDABLE END PRODUCTS FROM PRIMARILY RECLAIMABLE WASTE MATERIALS

[75] Inventor: James E. Turner, Southlake, Tex.

[73] Assignee: Tire Recyclers International, Inc., Southlake, Tex.

[22] Filed: Feb. 3, 1976

[21] Appl. No.: 654,959

[52] U.S. Cl. .................... 260/2.3; 260/2.5 HA; 260/2.5 HB; 260/4 R; 260/889; 260/892; 260/888; 264/109; 428/407
[51] Int. Cl.² .................... B29H 19/00; B32B 5/00
[58] Field of Search ............ 260/2.3, 3, 4 R, 4 AR, 260/5, 2.5 AK, 2.5 HA, 2.5 HB, 889, 892, 888; 264/122, 109, 126; 428/2, 68, 74, 76, 143, 218, 316, 317, 321, 322, 323, 147, 327, 402, 407, 409

[56] References Cited

UNITED STATES PATENTS

| | | | |
|---|---|---|---|
| 3,267,187 | 8/1966 | Slosberg et al. | 428/143 |
| 3,338,849 | 8/1967 | Johnson | 260/4 R |
| 3,386,925 | 6/1968 | Dillhoefer | 260/2.3 |
| 3,401,128 | 9/1968 | Terry | 264/321 |
| 3,489,710 | 1/1970 | Bonotto et al. | 260/4 R |
| 3,594,335 | 7/1971 | Schultz et al. | 428/306 |

*Primary Examiner*—William J. Van Balen
*Attorney, Agent, or Firm*—Warren H. Kintzinger

[57] ABSTRACT

A heat and pressure moldable material end product made from injection or extrusion molding processes using a mixture of reclaimed pre-vulcanized rubber bits and resinous thermoplastic material bits as raw material. The reset end product is a homogeneously incomplete mixture of the raw material, including reset resin and rubber mixture portions and rubber bits per se in a bonded inter-relationship. The porosity of the end product is controllable by the relative amount and size of rubber particles in the raw material mixture.

7 Claims, No Drawings

MOLDABLE END PRODUCTS FROM PRIMARILY RECLAIMABLE WASTE MATERIALS

This invention relates in general to new compositions of matter, and in particular, to a new raw material composed of reclaimed waste which is useful in making heat and pressure molded end products.

More specifically, the invention relates to end products fashioned by heat and pressure molding techniques, using scrap rubber tire material bits and waste polymer and copolymer material bits sized and proportioned to be useful for making the molded end product in the same general way and under the same general temperature settings and general conditions as if the product were made with plastic material alone.

The accumulation of old tires and waste resin products and containers has long presented an ecological problem with the non-biodegradable characteristic of such waste. Land fill area is rapidly disappearing, and many areas prohibit the burying of this type of waste, as well as the burning thereof.

Accordingly, an object of this invention is the provision for reclaiming waste rubber and scrap plastic resins for use in making molded end products.

Another object of the invention is the use of waste rubber and plastic resins in making molded end products having improved characteristics of resilience and toughness as compared to similar end products molded from rubber or plastic materials alone.

A further object of the invention is the provision of a material composition comprised of a mixture of particalized rubber tires and plastic resin waste material, with material bits sized and proportioned in the mixture to permit heat and pressure molding of an end product therefrom with a controllable degree of porosity.

Features of the invention, useful in accomplishing the above objects include, in a material useful for heat and pressure molding of end products, a raw material mixture comprising particalized pre-vulcanized rubber material, including the fibrous cord content thereof, and a lesser amount of particalized plastic resin material. The degree of porosity of the reset end product is controllable by and generally proportioned to, the size of the rubber material bits and the relative amount thereof utilized in the material mixture.

Efforts have been made to combine reclaimed old tires with asphalt and polyethylene to make improved road and play area surfaces (Johnson, U.S. Pat. No. 3,338,849). In Bollman, U.S. Pat. No. 2,041,223, sulphur is added to arrive at an adhesive or coating composition for use on rubber shoes and other uses. In Popham, U.S. Pat. No. 2,392,691, rubber and/or reclaimed rubber is added to phenol, with the resin used directly as a bonding agent, or with the materials ground into a powder form with fillers and a hardening agent as a moulding composition. In Leydon, U.S. Pat. No. 2,593,681, plastics, synthetic rubber and rubber are combined with solvents to form a liquid useful as a coating. Dillhoefer, U.S. Pat. No. 3,386,925 teaches blends of reclaimed rubbers and plastics which can be fabricated by extrusion and injection molding techniques.

I have found that a new and useful end product may be molded from particalized bits of reclaimed rubber tires and resinous plastic waste, by so selecting material bit sizes and relative proportions thereof in a raw material molding mixture that pressure and heat molding techniques may form the material mix into a reset end product which, in body section, comprises a homogeneously incomplete, reset mixture of the raw material mix, including portions of rubber-like material bits per se and portions of a reset melt of rubber bits and plastic bits, in a bonded relationship. The porosity of the end product, as might be desired and or imperative, in, for example, a minnow pail or a nursery pot container, is variable in proportion to the size of the rubber material bits and the relative amount, by weight, of these bits in the molding material mixture.

In a preferred embodiment, the mixture of the present invention comprises, by weight, a mixture of between 50% and 80% of particalized pre-vulcanized rubber-like material with particalized scrap plastic material such as various polymers, copolymers, or fiberglass. The rubber-like material may preferably comprise particalized tires, including the fibrous cord content thereof (generally not exceeding ten percent of the particalized tire material), and excluding the metallic content thereof.

For purposes of the invention, the term "particalized rubber tires" or prevulcanized rubber material which forms one portion of the material mixture is intended to mean one of the following materials: natural rubber, polymers, interpolymers and copolymers of conjugated diolefins, i.e., polybutadiene, butadiene-styrene copolymers, butadiene-acrylonitrile copolymers, polymers and copolymers of methylpentadiene; polymeric forms of chlorine substitution products of conjugated diolefins, i.e., polychloroprene; polymers of non-conjugated systems, i.e., polyisobutylene and copolymers of isobutylene and isoprene; and condensation polymers of the polysulphide type.

If the two materials in the mix are to be blended cold, the chosen kind of waste plastic is refined so that its particle size is approximately the size of the rubber particles with which it is mixed. If a Banbury mixer, or other type of hot mixer-blender, is used, the relative size of the particles is of less significance.

The porosity of the molded end product, using the above-defined material mixture in a heat and pressure molding process, is established in general by the relative amount of rubber material bits in the mix, as well as the size thereof. For example, a 50-50 rubber-plastic mixture results in an end product with very little porosity. An 80-20 rubber-plastic mixture results in a very porous end product. For purposes of the invention, rubber material particles from 30 mesh size up to ⅜ inch screen mesh size can be used. When using particalized rubber tires as the rubber-like ingredient in the mixture, all of the rubber tire that passes through the screen is used except the metal, which would be magnetically separated.

Because of the insulating qualities of the rubber particles used and the potentially high porosity of the rubber particles (which again makes it very insulative), the mold used for forming the end product may be modified from, for example, the same mold used for molding plastic-only materials. Generally, a larger gate opening and travel paths for the resin or feedstock to flow throughout the mold are needed. Because of the increase of substance in the rubber-plastic mixture, more flow paths may be created to assure material flow from one end of the mold to the other. Pressure would normally be increased from that used to mold plastic alone. These provisions are, however, but modifications to state of the art molding technology as it applies to various and sundry plastics and fiberglass.

The resulting end product, using the mixture described herein has improved properties of resiliency, toughness, weight, and porosity as compared to molded plastic products.

By control of heat, cooking time, pressure and other molding process parameters, the end product may exhibit a selected degree of porosity and weight in comprising a reset, incompletely homogeneous, mixture of melted plastic-rubber blend bonded to rubber bits per se, and including gas formed material voids therein. The resulting end products, including garbage cans, nursery pots, buckets, fence posts, and railroad cross ties, in being made from such reclaimed waste materials, are obviously less expensive than currently used counterparts, while exhibiting, in many usages, improved strength, weight, resilience, and porosity characteristics.

Whereas this invention is herein described with respect to a preferred embodiment, it should be realized that various changes may be made without departing from essential contributions to the art made by the teachings hereof.

I claim:

1. A heat and pressure molded end product comprising a mixture of particalized rubber tires including the fibrous cord content thereof and a lesser amount of synthetic resin thermoplastic material bits, said end product comprising a substantially homogeneously incomplete reset mixture, including portions of a reset mixture of melted synthetic thermoplastic resin and rubber tire particles, and portions of said rubber tire particles, per se, in a bonded relationship, the porosity of said end product being substantially proportional to the ratio of said rubber tire particles to said synthetic thermoplastic resin material bits in said mixture.

2. The product of claim 1 with said synthetic thermoplastic resin material comprising particalized scrap including at least one of the materials polyethylene, styrene, and polypropylene.

3. The product of claim 1, with said synthetic thermoplastic resin material comprising fiberglass.

4. The product of claim 2, with said end product comprising, in material cross section, a plurality of gas-formed material voids between substantially contiguous wall surfaces.

5. The product of claim 4, with said particalized rubber tire material comprising, by weight, not less than 50 percent and not more than 80 percent of said mixture.

6. The product of claim 5, with said particalized rubber tire material comprising material bits sized between 30 mesh and ⅜ inch screen mesh.

7. The product of claim 6, with the fibrous content of said particalized rubber tires comprising less than 10 percent of said mixture by weight.

* * * * *